United States Patent
Obrador

(10) Patent No.: US 6,992,707 B2
(45) Date of Patent: Jan. 31, 2006

(54) DELAYED ENCODING BASED JOINT VIDEO AND STILL IMAGE PIPELINE WITH STILL BURST MODE

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 326 days.

(21) Appl. No.: 10/090,804

(22) Filed: Mar. 6, 2002

(65) Prior Publication Data

US 2003/0169278 A1   Sep. 11, 2003

(51) Int. Cl.
*H04N 5/225* (2006.01)
(52) U.S. Cl. ............................. 348/220.1; 348/207.99
(58) Field of Classification Search ................ 348/231, 348/333.05, 272, 220.1, 207.99; 396/310, 396/72; 345/435, 606; 382/167, 303
See application file for complete search history.

(56) References Cited

U.S. PATENT DOCUMENTS

| | | | | |
|---|---|---|---|---|
| 4,484,349 A | * | 11/1984 | McCubbrey | 382/308 |
| 5,022,090 A | * | 6/1991 | Masaki et al. | 382/303 |
| 5,046,190 A | * | 9/1991 | Daniel et al. | 382/303 |
| 5,287,416 A | * | 2/1994 | Capo et al. | 382/303 |
| 5,561,777 A | | 10/1996 | Kao et al. | 395/405 |
| 5,790,125 A | | 8/1998 | Bui et al. | 345/435 |
| 5,991,465 A | * | 11/1999 | Anderson et al. | 382/302 |
| 6,292,218 B1 | * | 9/2001 | Parulski et al. | 348/220.1 |
| 6,330,400 B1 | * | 12/2001 | Bittner et al. | 396/72 |
| 6,563,535 B1 | * | 5/2003 | Anderson | 348/231.2 |
| 6,720,968 B1 | * | 4/2004 | Schultz et al. | 345/535 |
| 2002/0054116 A1 | * | 5/2002 | Pavley et al. | 345/765 |
| 2002/0135683 A1 | * | 9/2002 | Tamama et al. | 348/222 |
| 2003/0021474 A1 | * | 1/2003 | Hunter et al. | 382/167 |
| 2003/0048279 A1 | * | 3/2003 | Kok et al. | 345/606 |
| 2003/0052981 A1 | * | 3/2003 | Kakarala et al. | 348/272 |
| 2003/0052986 A1 | * | 3/2003 | Matsumoto | 348/333.05 |
| 2003/0058355 A1 | * | 3/2003 | Wong et al. | 348/231.99 |
| 2003/0112347 A1 | * | 6/2003 | Wyman | 348/231.99 |
| 2003/0147640 A1 | * | 8/2003 | Voss et al. | 396/310 |

* cited by examiner

*Primary Examiner*—Richard Hjerpe
*Assistant Examiner*—Blake Betz

(57) ABSTRACT

A digital video camera system may utilize a joint video and still image pipeline that simultaneously acquires, processes, transmits and/or stores digital video and high resolution digital still image photographs. The joint pipeline may include a video pipeline optimized for digital video frames and a high resolution still image pipeline optimized for high resolution digital still images. The digital video camera system may also concurrently acquire and process video frames and high resolution still image in burst mode using delayed encoding technology.

29 Claims, 8 Drawing Sheets

DELAYED ENCODING BASED JOINT VIDEO AND STILL IMAGE PIPELINE WITH STILL BURST MODE

TECHNICAL FIELD

The technical field relates to video imaging systems, and, in particular, to joint video and still image pipelines.

BACKGROUND

Digital cameras are widely used to acquire high resolution still image photographs. Digital video cameras are also used to record home videos, television programs, movies, concerts, or sports events on a magnetic disk or optical DVD for storage or transmission through communications channels. Some commercial cameras are able to take both digital video and digital still image photographs. However, most of these cameras required a user to switch between a video recording mode and a digital still image mode. Separate pipelines are generally used for each of the video recording and still image modes. Examples of these cameras include SANYO ID-SHOT® and CANNON POWERSHOT S300®. The SANYO ID-SHOT® uses an optical disk, whereas the CANNON POWERSHOT S300® uses synchronous dynamic random access memory (SDRAM). However, both cameras are still image cameras that have the capability of taking video clips, using separate pipelines.

Other cameras use a single software pipeline to acquire both digital video and low quality still images by taking one of the video frames as is, and storing the particular video frame as a high resolution still image. Examples of such cameras include JVC GR-DVL9800®, which is a digital video camera that allows a user to take a picture at certain point in time. However, the pictures taken generally are of low quality, because a low resolution video pipeline is used to generate the high resolution still image pictures.

When still images are acquired in burst mode, current cameras try to process both pipelines independently. If a single hardware processing pipeline is used, a large frame buffer may be needed to store video frames while the burst mode still images are processed. However, a large frame buffer is costly, and build up delay on the video side may be undesirable.

Other cameras try brute force real time processing, which is costly.

SUMMARY

A method and corresponding apparatus for concurrently processing digital video frames and high resolution still images in burst mode include acquiring with high priority video frames and high resolution still images in burst mode from one or more image sensors, and storing with high priority the video frames and the high resolution still images in raw format in a memory during acquisition of the high resolution still images in burst mode. The method and corresponding apparatus further include processing with low priority the video frames stored in the memory using a video pipeline, and processing the high resolution still images acquired during the burst mode using a high resolution still image pipeline. The high resolution still image pipeline runs concurrently with the video pipeline.

In an embodiment, the video frames and the high resolution still images are acquired and stored in real time. In another embodiment, the high resolution still images are filtered and downsampled to be inputted into the video pipeline to make up deficiencies. In yet another embodiment, the video frames and the high resolution still images are processed into a standard format by an image/video transcoding agent.

DESCRIPTION OF THE DRAWINGS

The preferred embodiments of the method and corresponding apparatus for concurrently processing digital video frames and high resolution still images in burst mode will be described in detail with reference to the following figures, in which like numerals refer to like elements, and wherein.

DETAILED DESCRIPTION

A digital video camera system may utilize a joint video and still image pipeline that simultaneously acquires, processes, transmits and/or stores digital video and high resolution digital still image photographs. The joint pipeline may include a video pipeline optimized for digital video frames and a high resolution still image pipeline optimized for high resolution digital still images. The digital video camera system may also concurrently acquire and process video frames and high resolution still image in burst mode using delayed encoding technology. The delayed encoding technology acquires video frames and burst mode still images in raw format without processing, and stores the video frames and the high resolution still images acquired during the burst mode into a memory or storage device. The video frames and the high resolution still images may be processed with low priority if extra time and processing power are available. The digital video camera system processes the stored video frames and the stored high resolution still images acquired during the burst mode after the burst mode or video recording stops.

Figure 1:
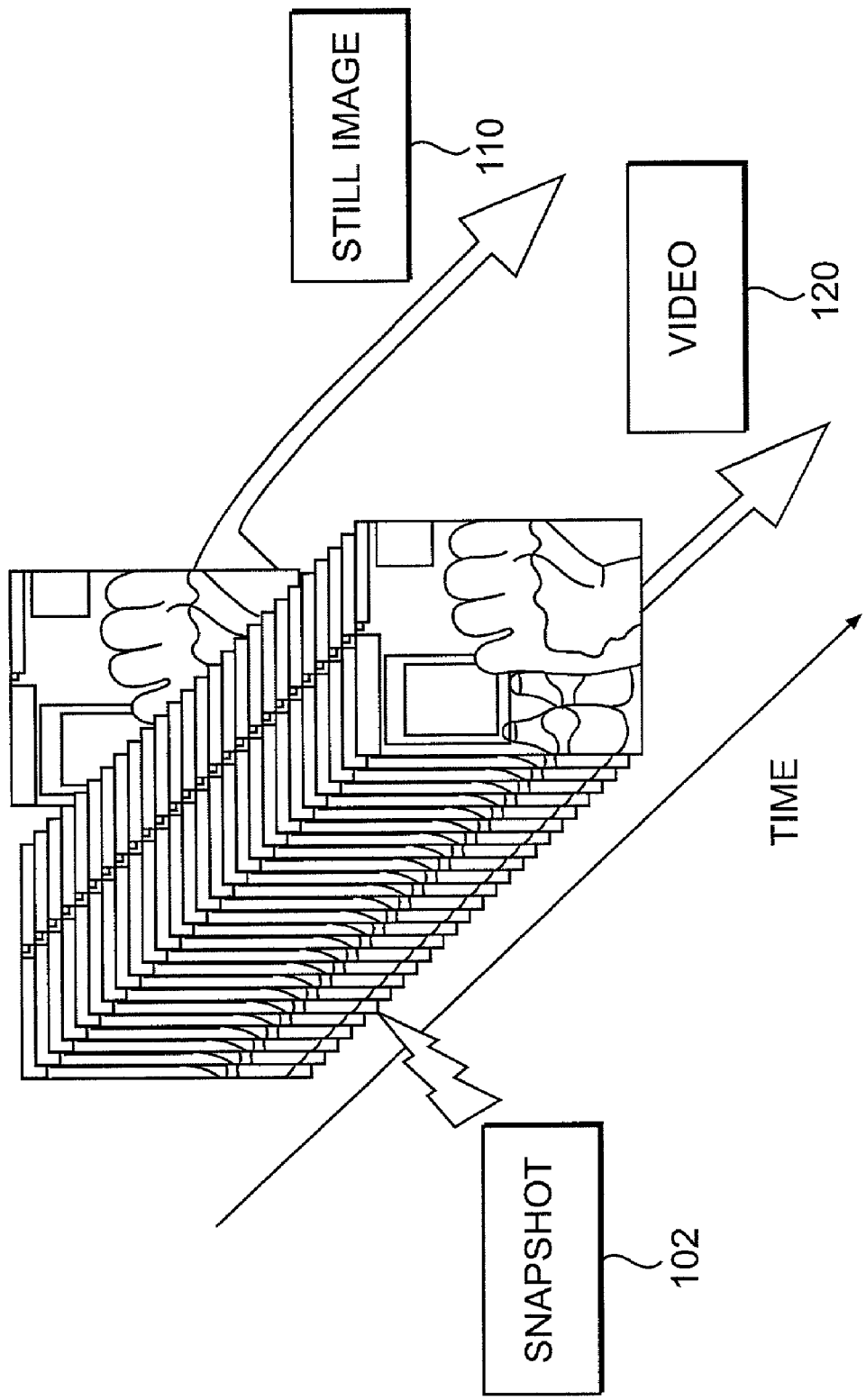
FIG. 1 illustrates an exemplary operation of an exemplary joint video and still image pipeline.

FIG. 1 illustrates an exemplary operation of an exemplary joint video and still image pipeline, which is capable of simultaneously capturing digital video frames 120 and high resolution digital still image frames 110. The video frames 120 may be acquired at, for example, 30 frames per second (fps). During video frame acquisition, a snapshot 102 may be taken to acquire a particular still image frame 110 in high resolution, which is then processed. During the high resolution still image processing, all incoming video frames 120 that are captured during that time may be temporarily stored, i.e., buffered, in a frame buffer 330 (shown in FIG. 3) before being processed. Both the video frames 120 and the high resolution still image frame 110 may be stored or transmitted through communications channels, such as a network.

Figure 2:
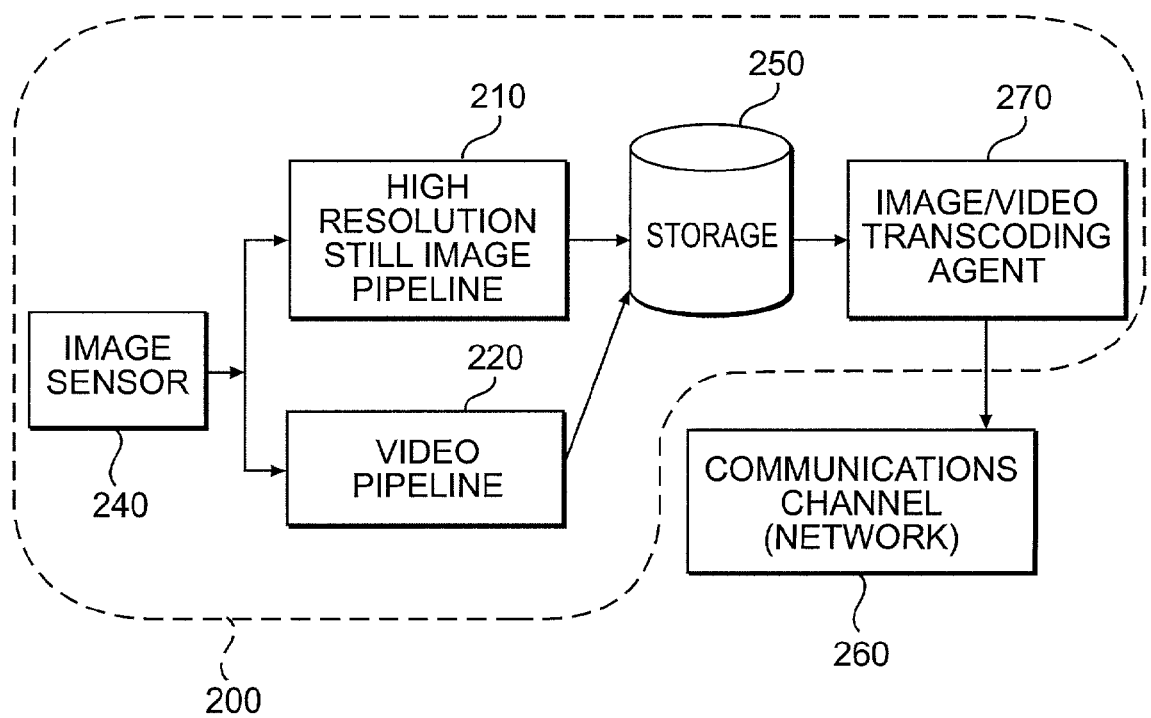
FIG. 2 illustrates a preferred embodiment of a video camera system using the exemplary joint video and still image pipeline of FIG. 1.

FIG. 2 illustrates a preferred embodiment of a video camera system 200 using the exemplary joint video and still image pipeline. In this embodiment, a video pipeline 220 and a high resolution still image pipeline 210 share a same high resolution image sensor 240. The high resolution image sensor 240, which may be a charge coupled device (CCD) sensor or a complimentary metal oxide semiconductor (CMOS) sensor, may take high resolution still image frames 110 while acquiring medium resolution video frames 120. This embodiment is inexpensive because the video camera system 200 uses one hardware processing pipeline 300 (shown in FIG. 3) with one image sensor 240 and one processor 360 (shown in FIG. 3).

The image sensor 240 typically continuously acquires high resolution video frames 120 at a rate of, for example, 30 fps. Each of the high resolution video frames 120 may be converted into a high resolution still image photograph 110. When a user is not interested in taking a high resolution still image photograph 110, the only pipeline running may be the video pipeline 220, which acquires high resolution video frames 120, and downsamples the frames to medium resolution (for example, 640×480), then processes the medium resolution video frames 120. When the user wants to acquire a high resolution still image frame 110, the image acquired by the high resolution image sensor 240 can be used both in the video pipeline 220 as well as in the high resolution still image pipeline 210 (described in detail later).

The video camera system 200 may include a storage device 250 and a connection with a communications channel/network 260, such as the Internet or other type of computer or telephone networks. The storage device 250 may include a hard disk drive, floppy disk drive, CD-ROM drive, or other types of non-volatile data storage, and may correspond with various databases or other resources. After the video frames 120 and the high resolution still image frames 110 are acquired, the video frames 120 and the high resolution still image frames 110 may be stored in the storage device 250 or transmitted through the communication channel 260. The video camera system 200 may also include an image/video transcoding agent 270 for encoding the video frames 120 and the high resolution still image frames 110 into a standard format, for example, tagged image file format (TIFF) or Joint Photographic Experts Group (JPEG).

Figure 3:
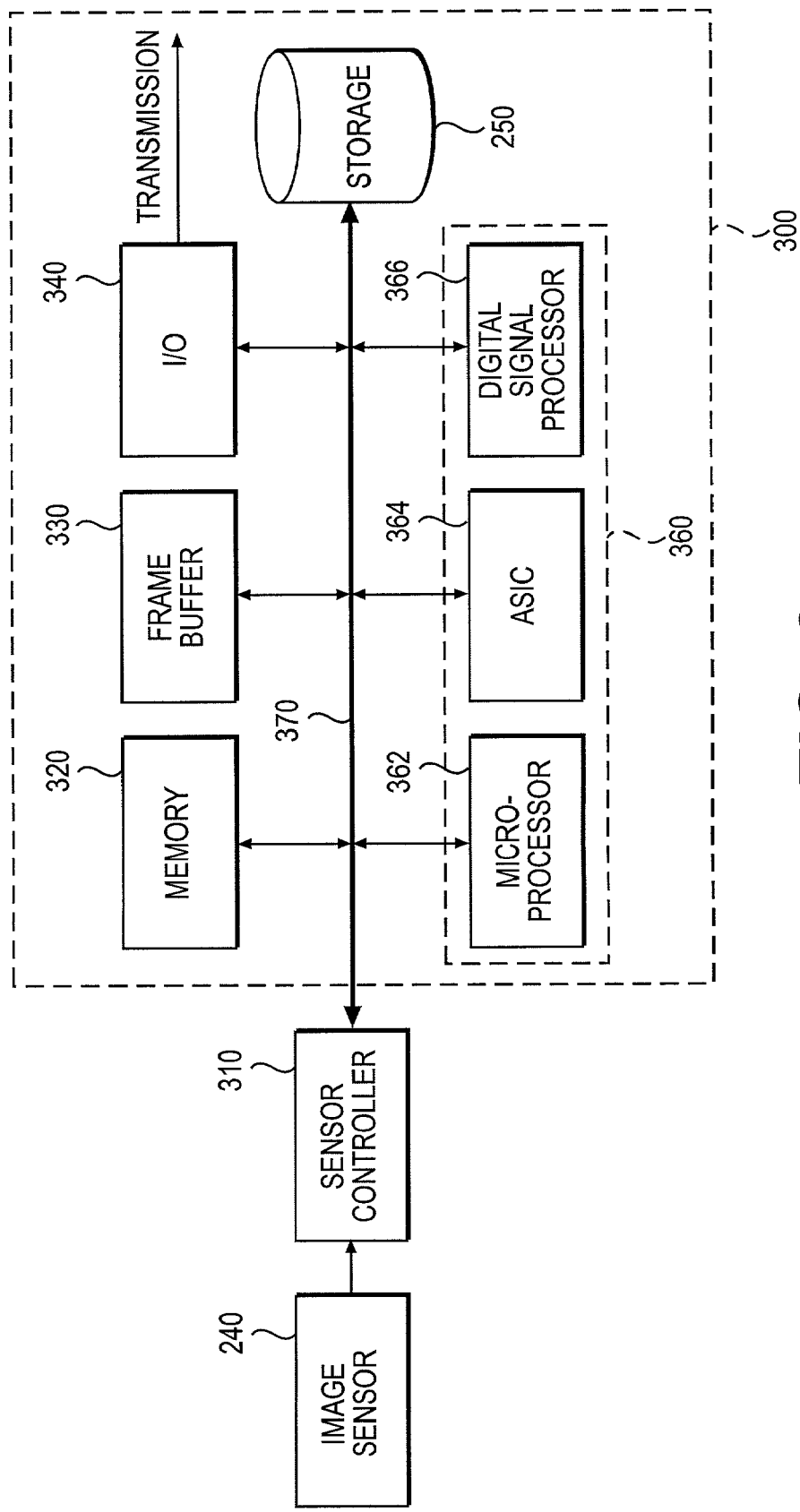
FIG. 3 illustrates an exemplary hardware implementation of the exemplary joint video and still image pipeline of FIG. 1.

FIG. 3 illustrates an exemplary hardware implementation of the preferred embodiment of the exemplary joint video and still image pipeline. This embodiment includes the single hardware processing pipeline 300 supporting two software pipelines. A sensor controller 310 may be controlled by a user to retrieve high resolution mosaiced still image frames 110 at a rate of, for example, one every thirtieth of a second to generate a video signal. The sensor controller 310 may then store the selected high resolution still image frames 110 into a memory 320. The memory 320 may include random access memory (RAM) or similar types of memory. Next, the high resolution still image frames 110 may be processed using a processor 360, which may be a microprocessor 362, an ASIC 364, or a digital signal processor 366. The ASIC 364 performs algorithms quickly, but is application specific and only performs a specific algorithm. On the other hand, the microprocessor 362 or the digital signal processor 366 may perform many other tasks. The processor 360 may execute information stored in the memory 320 or the storage device 250, or information received from the Internet or other network 260. The digital video and still image data may be copied to various components of the pipeline 300 over a data bus 370.

In the video pipeline 220, the processor 360 may downsample, demosaic, and color correct the video frames 120. Next, the processor 360 may compress and transmit the video frames 120 through an input/output (I/O) unit 340. Alternatively, the video frames 120 may be stored in the storage device 250.

Both pipelines 210, 220 may be executed concurrently, i.e., acquiring high resolution still image photographs 110 during video recording. A frame buffer 330 may store video frames 120 while the processor 360 is processing the high resolution still image frame 110. The sensor controller 310 may still capture video frames 120 at a rate of, for example, 30 fps, and store the video frames 120 into the memory 320. The processor 360 may downsample the video frames 120 and send the downsampled video frames 120 into the frame buffer 330. The frame buffer 330 may store the downsampled video frames 120 temporarily without further processing. This may incur some delay in the video pipeline 220 if the video is directly transmitted through the communications channel 260. However, this delay may be compensated by a similar buffer on the receiver end. During video frame buffering, the high resolution still image frame 110 may be processed by the processor 360, using complex algorithms. At the same time, the video frames 120 may be continuously stored into the memory 320, downsampled, and sent into the frame buffer 330 to be stored.

Although the video camera system 200 is shown with various components, one skilled in the art will appreciate that the video camera system 200 can contain additional or different components. In addition, although the video frames 120 and the still image frames 110 are described as being stored in memory, one skilled in the art will appreciate that the video frames 120 and the still image frames 110 can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the video camera system 200 to perform a particular method.

Figure 4A:
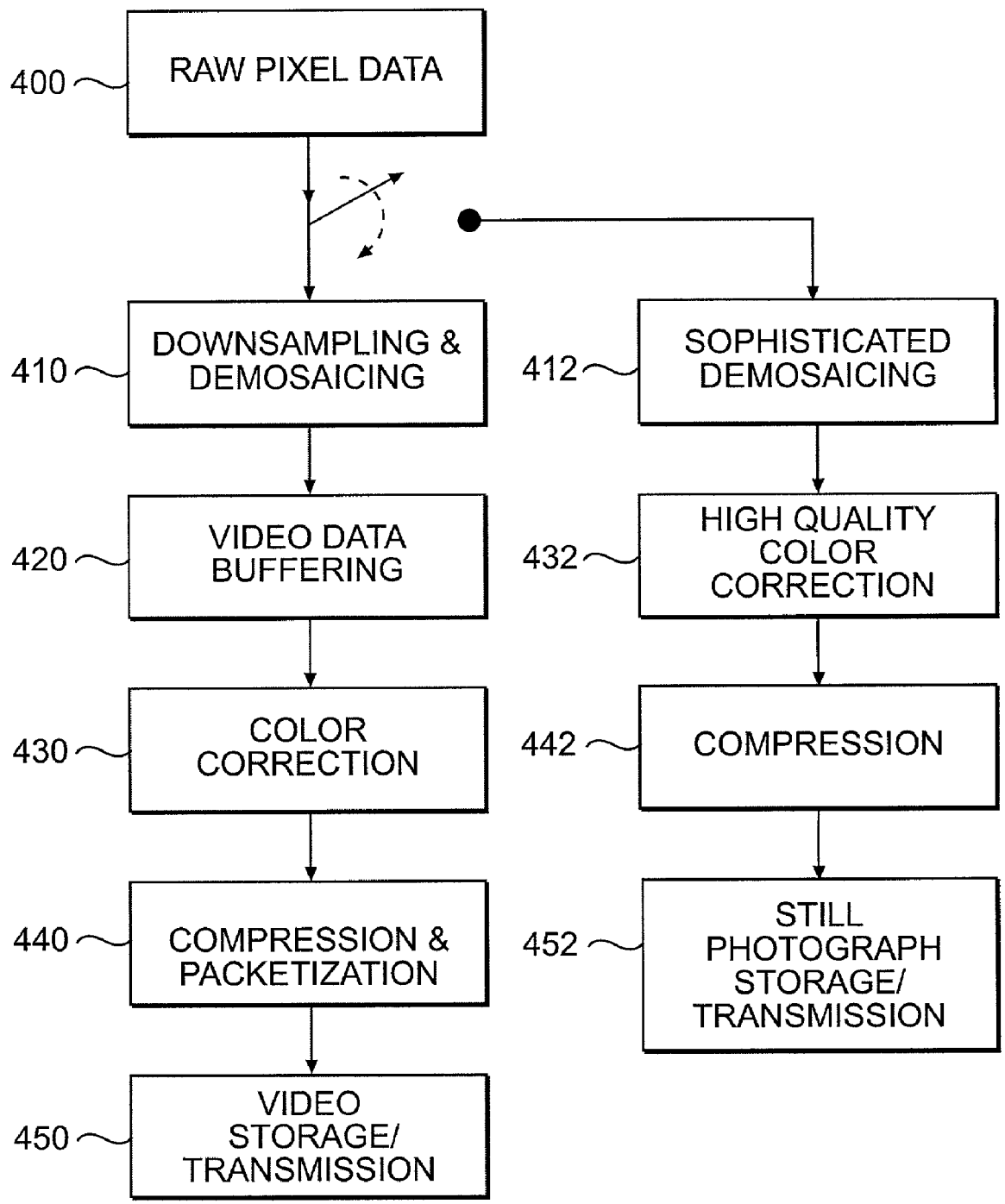
FIGS. 4A–4C are flow charts describing in general the exemplary joint video and still image pipeline of FIG. 1.
Figure 4B:
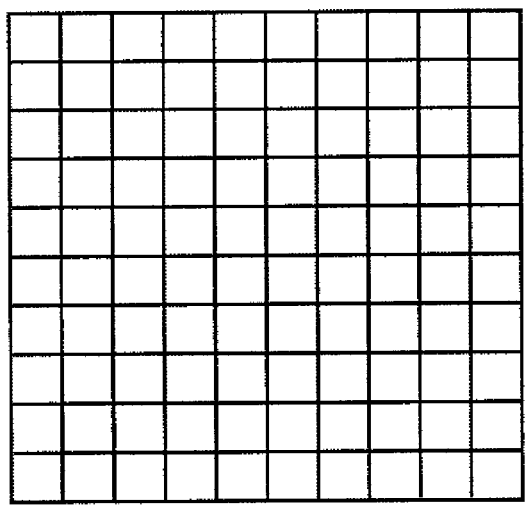
Figure 4B:
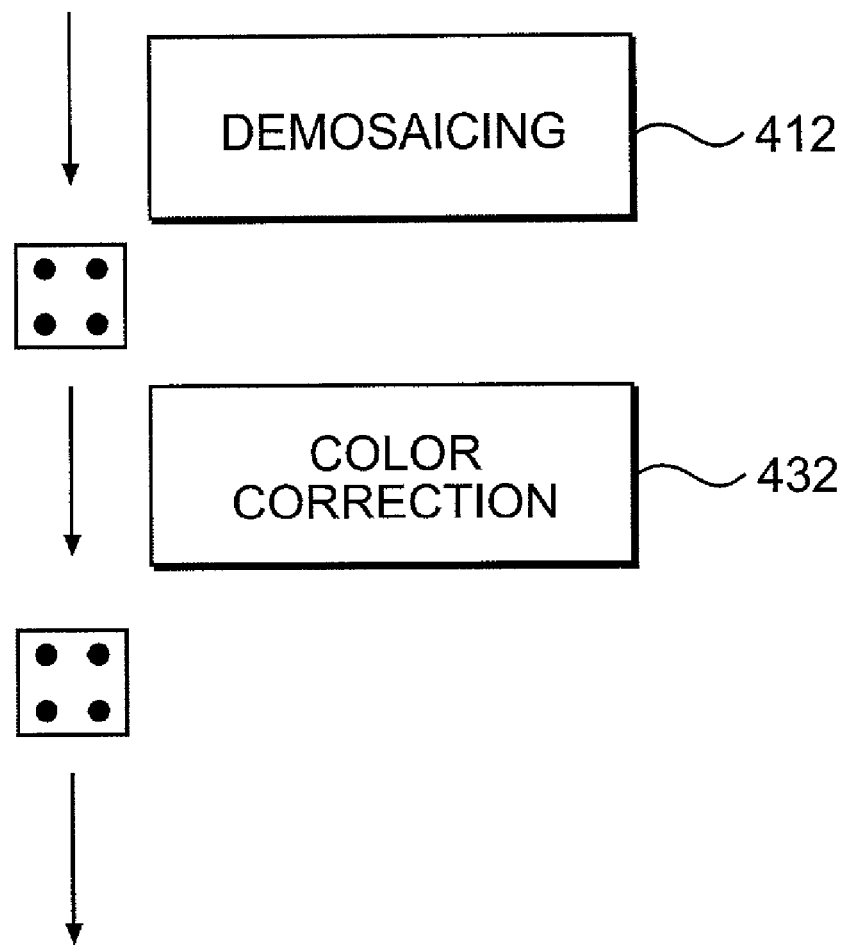
Figure 4C:
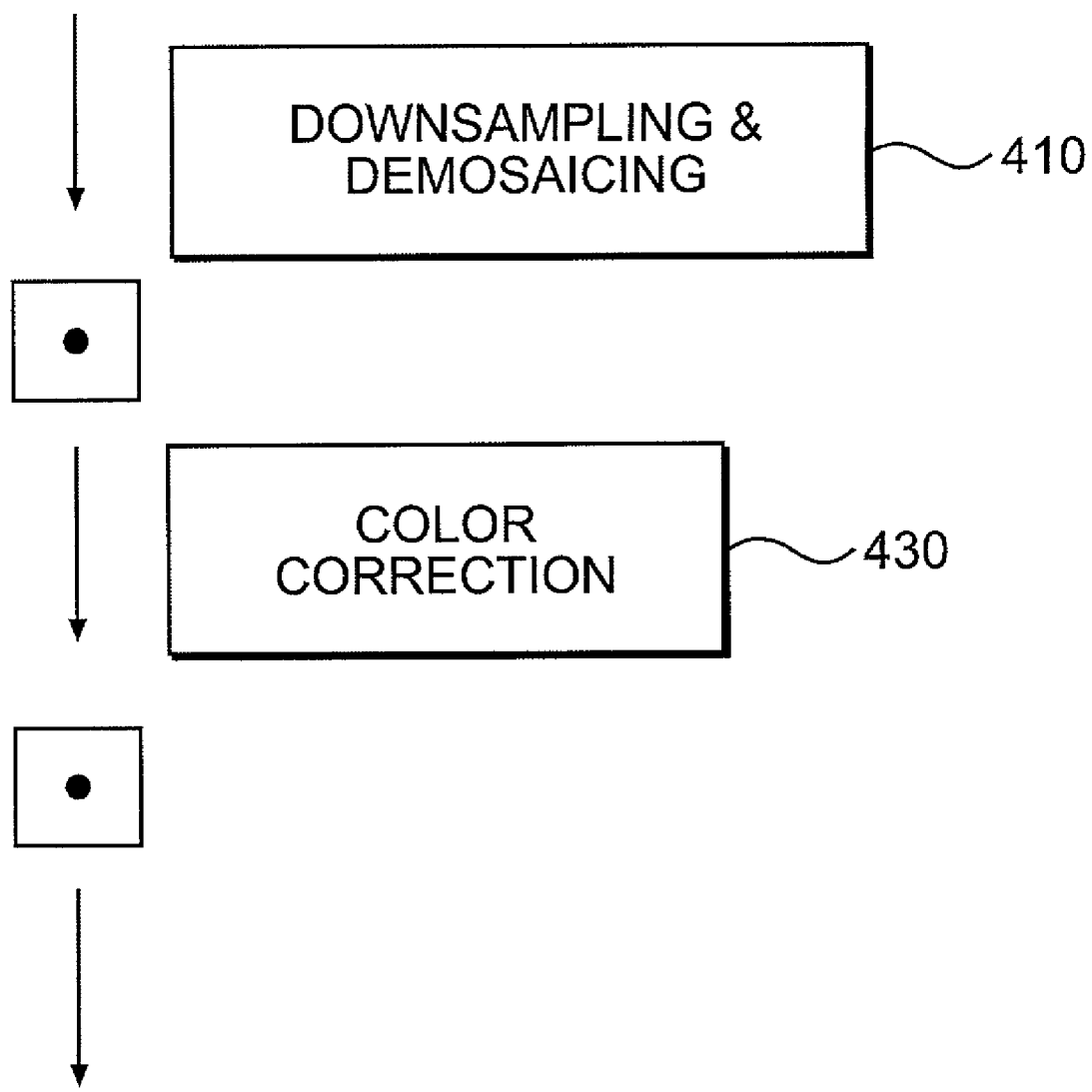

FIGS. 4A–4C are flow charts describing in general the exemplary joint video and still image pipeline. Referring to FIG. 4A, operation of the video pipeline 220, shown on the left, typically results in continuous processing of video frames 120. Operation of the high resolution still image pipeline 210, shown on the right, typically results in processing a high resolution still image frame 110 every time the user wants to acquire a high resolution photograph.

After raw pixel video data of video frames 120 are acquired, for example, at 1024×1008 and 30 fps (block 400), the video frames 120 may be downsampled and demosaiced in order to save memory space (block 410). Then, the frame buffer 330 may buffer the video frames 120 while the high resolution still image frame 110 is being acquired, processed, stored, and/or transmitted (block 420). Alternatively, demosaicing may be performed after the video frames 120 are buffered. Thereafter, the video pipeline 220 may start emptying the frame buffer 330 as fast as possible, and performing color correction, compression, storage and/or transmission (blocks 430, 440, 450). Once the frame buffer 330 is emptied, another high resolution still image frame 110 may be acquired.

For high resolution still image frames 110, sophisticated demosaicing may be performed (block 412), followed by high quality color correction (block 432). The high resolution still image frames 110 may optionally be compressed (block 442), and then stored and/or transmitted through similar communications channels 260 (block 452).

FIG. 4B illustrates in detail the operation of the high resolution still image pipeline 210. The sophisticated demosaicing process (block 412) utilizes a high quality demosaicing algorithm that generates a high quality color image from the originally mosaiced image acquired by the image sensor 240. The demosaicing process is a time consuming filtering operation, which may gamma-correct the input if the image sensor 240 has not done so, resulting in excellent color image quality with almost no demosaicing artifacts. For example, demosaicing for high resolution still image frames 110 may filter the original image with a 10×10 linear filter. The demosaicing algorithm takes into account the lens used for acquisition, as well as the spectral sensitivity of each of the color filters on the mosaic.

Once the high resolution still image frame 110 is demosaiced, the high resolution still image frame 110 may be color corrected depending on the illumination present at the time of the capture (block 432). Complex transformation matrices may be used to restore accurate color to the high resolution still image frames 110, in order to generate an excellent photograph. The color correction algorithms, may be similar to the algorithm used in the HP-PHOTOSMART 618®.

FIG. 4C illustrates in detail the operation of the video pipeline 220. A high quality video pipeline 220 may demand large amount of processing power for computation. Because the video processing needs to be achieved at, for example, 30 fps, downsampling may be fast. In addition, lower resolution video frames 120 (for example, 640×480 pixels) demands much less quality demosaicing (block 410), because the human visual system may not notice certain artifacts at high video frame rates. For example, demosaicing for video frames 120 may filter the original image with a 4×4 linear filter. Similarly, color correction may be simpler because high quality is not needed on the video side (block 430).

When a user acquires high resolution still images in burst mode, the digital video camera system 200 uses delayed encoding technology to acquire and store video frames and burst mode high resolution still images in raw format into the memory 320 or the storage device 250.

The frame buffer 330 may be used for loss-less compression of the raw high resolution still image frames 110 and intermediate processing of the video frames 120 until one of the high resolution still image frames 110 is acquired. The length of the burst mode and the amount of processing power define the size of the frame buffer 330, which is preferably kept to minimum due to cost. The high resolution still image frames 110 may be used to reset Moving Picture Experts Group (MPEG) encoding process as intraframes (I-frames). I-frames are frames not compressed depending on previous or future frames, i.e., stand alone compressed frames. I-frames do not depend on information from other frames to be compressed. Accordingly, all compression algorithms may start with an I-frame, and all other frames may be compressed based on the I-frame.

After one of the I-frames are acquired, the processor 360 stores the video frames 120 and high resolution still image frames 110 in raw format without any processing into the memory 320 or the storage device 250. If extra time and processing power are available, some stored video frames 120 and high resolution still image frames 110 may be processed. After the user stops video recording or acquiring high resolution still images in burst mode, the processor 360 starts processing the video frames 120 and the high resolution still image frames 110 in parallel.

Figure 5:
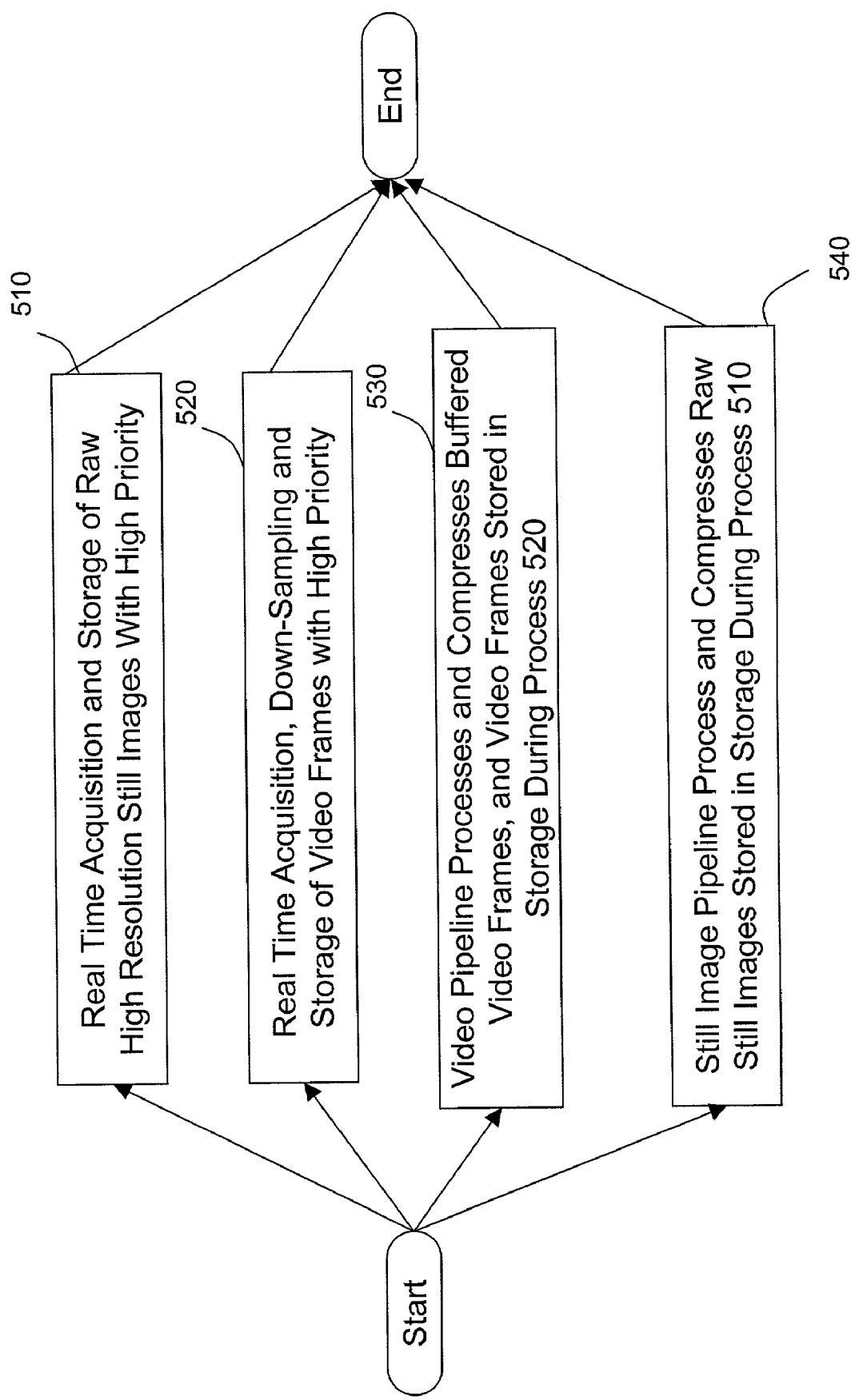
FIG. 5 illustrates an exemplary multithread system for concurrently processing video frames and high resolution still images in burst mode.

During the burst mode still image acquisition, a multi-thread system may be employed. FIG. 5 illustrates an exemplary multithread system for concurrently processing video frames and high resolution still images in burst mode with different levels of priority.

Referring to FIG. 5, block 510 represents real time acquisition and storage of raw high resolution still image frames 110 at, for example, B fps. If the video frames are sampled at, for example, 30 fps, and B=3, the burst mode represents acquiring one high resolution still image every ten video frames. The high resolution still image frames 110 are typically stored in the memory 320 or the storage device 250. This process has high priority. Some loss-less compression may be conducted so that less storage is needed.

Block 520 represents real time acquisition, downsampling, and storage of video frames 120 at, for example, (30-B) fps. The high resolution still image frames 110, for example, B frames, are inputted into the video processing pipeline 220. During processing, the high resolution still image frames 110 may be filtered and downsampled to generate lower resolution video frames to be inputted into the video processing pipeline 220 to make up the deficiency. For example, if video frames are sampled at 30 fps, and high resolution still image frames are acquired at 3 fps, then one out of ten frames are sent to the high resolution still image pipeline 210. The frames are later downsampled and inputted into the video pipeline 220. Alternatively, the filtering and downsampling process may be performed in block 530 (described later). The video frames 120 are also stored in raw format in the memory 320 or the storage device 250. This process also has high priority.

In block 530, low priority video processing pipeline 220 processes and compresses buffered video frames 120 and the video frames 120 stored during process 520. Therefore, while processes 510 and 520 have high priority, any extra time and processing power may be used to process and compress the stored video frames 120.

In block 540, low priority still image processing pipeline 210 processes and compresses each of the raw high resolution still image frames 110. Whenever extra time and processing power are available, the processors 360 may process small amount of high resolution still image frames 110.

Processes 530 and 540 remain active with low priority until all the video frames 120 and the high resolution still image frames 110 stored in processes 510 and 520 have been successfully encoded and stored. Therefore, the overall data is stored in real time, and low priority processes process the data in the background with non-real time processing, so as to reduce computational burden. Processes 510, 520, 530 and 540 may be implemented independently with the one or more processors 360.

For example, 90% of time may be spent on processes 510 and 520, and 10% of time on processes 530 and 540. When the user stops the burst mode or video recording, the low priority processes 530 and 540 gain higher share of the total processing power. In the above example, if burst mode is stopped, process 520 is processed at 30 fps, as opposed to (30-B) fps, because no more high resolution still image frames 110 are acquired.

If memory space is available, the video camera system 200 continues to compress video frames 120 and still image frames 110 in the memory 320 or the storage device 250. However, if the memory 320 or the storage device 250 is filled up with no extra space to process and compress new video frames 120 and burst mode high resolution still image frames 110, a flag may be used to signal that image and/or video acquisition needs to stop. Processes 530 and 540 may take advantage of the internal memory 320 and frame buffer 330 to continue processing and compressing the buffered video frames 120 and the raw still images 110, thus freeing up some storage space for more image and/or video acquisition. If this is not achieved, then the video frames 120 and the high resolution still image frames 110 may be encoded at transmission/download time with the image/video transcoding agent 270. In other words, if the video frames or the still image frames are not fully encoded due to lack of memory space, the video frames and the still images frames can be encoded fully at download time by the image/video transcoding agent 270.

Within the video camera system 200, the video frames 120 and the high resolution still image frame 110 may be kept in a nonstandard proprietary format. The image/video transcoding agent 270, which typically runs on the video camera system 200, detects when a video frame 120 or a high resolution still image frame 110 is to be downloaded and transcodes the proprietary loss-less (or near loss-less) raw video frame 120 or high resolution still image frame 110 into a processed video or image, which is then packed into a standard compression format, for example, TIFF or JPEG. Alternatively, the image/video transcoding agent 270 may run on a docking station or on the host personal computer (PC).

Figure 6A:
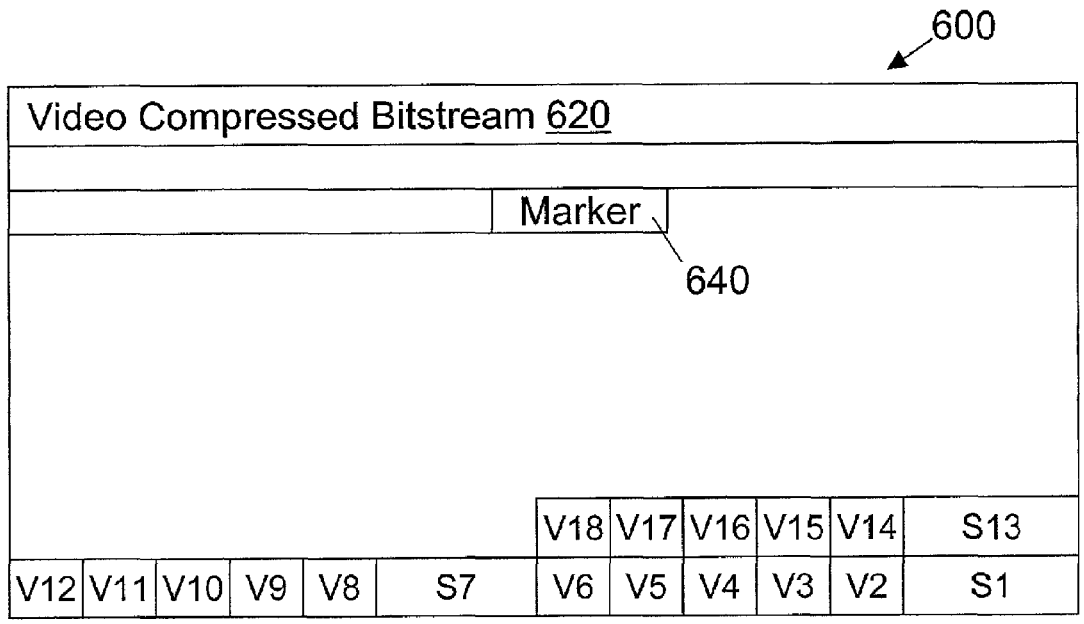
FIGS. 6A and 6B illustrate an exemplary memory map to implement the multithread system of FIG. 5.
Figure 6B:
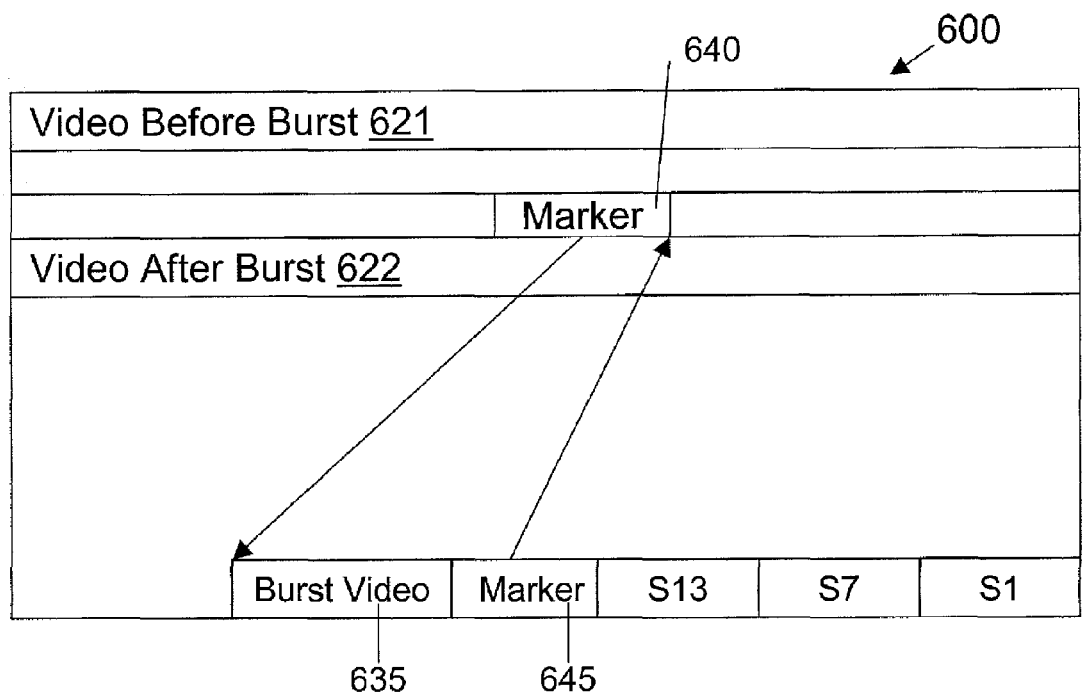

FIGS. 6A and 6B illustrate an exemplary memory map 600 to implement the multithread system of FIG. 5. Referring to FIG. 6A, video compressed bitstream 620 appears at the top of the memory map 600. When the user starts the burst mode, a marker 640 is placed in the video bitstream 620, signaling that little processing or compressing occurs from that point in time. High priority processes 510, 520 perform real time acquisition and storage of video frames 120 and high resolution still image frames 110 in raw format during the burst mode. After the burst mode or video recording stops, or if extra time and processing power exist, low priority processes 530, 540 take over and resume processing.

Video frames 120 and high resolution still image frames 110 acquired during the burst mode are stored in raw format at the bottom of the memory map 600. For example, $S_1$, $S_7$, $S_{13}$ are high resolution still image frames #1, #7, and #13, whereas $V_2$, $V_3$, $V_4$, $V_5$, $V_6$, $V_8$, $V_9$, $V_{10}$, $V_{11}$, $V_{12}$, $V_{14}$–$V_{18}$ are video frames #2, 3, 4, 5, 6, 8, 9, 10, 11, 12, 14–18. In other words, in this example, three burst mode high resolution still image frames $S_1$, $S_7$, $S_{13}$ are generated from 18 frames. After the high resolution still image frames 110 are acquired, or if extra time and processing power exist, low priority processes 530, 540 start processing the raw data, i.e., still image frames $S_1$, $S_7$, $S_{13}$ and the rest of the video frames. The low priority processes also combines the video frames 120 with filtered and downsampled versions of the high resolution still image frames 110 in order to generate a continuous compressed video sequence 120. For example, the processors 360 downsample $S_1$ into $V_1$, $S_7$ into $V_7$, and $S_{13}$ into $V_{13}$, so that a continuous video sequence is generated, from $V_1$ to $V_{18}$.

Referring to FIG. 6B, video before burst mode 621 are stored before the marker 640, whereas video after the burst mode 622 are stored after the marker 640. The marker 640 points to video sequence acquired during the burst mode 635, followed by another marker 645 pointing back to the video after the burst mode 622. Therefore, no discontinuation exists in the video sequence 120. The high resolution still image frames $S_1$, $S_7$, $S_{13}$ are processed and placed separately in the memory map 600 from the video sequence acquired during the burst mode 635. This linking mechanism in the memory map 600 is similar to computer file system.

While the method and apparatus for concurrently processing digital video frames and high resolution still images in burst mode have been described in connection with an exemplary embodiment, those skilled in the art will understand that many modifications in light of these teachings are possible, and this application is intended to cover any variations thereof.

What is claimed is:

1. A method for concurrently processing digital video frames and high resolution still images in burst mode, comprising:

acquiring with high priority video frames and high resolution still images in burst mode from one or more image sensors;

storing with high priority the video frames and the high resolution still images in raw format in a memory during acquisition of the high resolution still images in burst mode;

processing with low priority the video frames stored in the memory using a video pipeline; and processing with low priority the high resolution still images acquired during the burst mode using a high resolution still image pipeline, wherein the high resolution still image pipeline runs concurrently with the video pipeline.

2. The method of claim 1, wherein the acquiring step includes acquiring the video frames and the high resolution still images in real time.

3. The method of claim 1, wherein the storing step includes storing the video frames and the high resolution still images in real time.

4. The method of claim 1, further comprising downsampling the high resolution still images to be inputted into the video pipeline.

5. The method of claim 1, wherein the processing the high resolution still images step includes processing the video frames and the high resolution still images into a standard format by an image/video transcoding agent.

6. The method of claim 1, wherein the processing the video frames step comprises: downsampling and demosaicing the video frames; and color correcting the video frames.

7. The method of claim 1, wherein the processing the high resolution still images step comprises:

downsampling and demosaicing the high resolution still images using complex demosaicing algorithms; and color correcting the high resolution still images using complex color correction algorithms.

8. The method of claim 1, further comprising compressing the video frames and the high resolution still images.

9. A joint video and still image pipeline for a video camera system, comprising:

one or more image sensors capable of concurrently acquiring with high priority video frames and high resolution still images in burst mode;

a sensor controller capable of storing with high priority the video frames and the high resolution still images acquired during the burst mode in raw format into a memory; and one or more processors capable of concurrently processing with low priority the video frames and the high resolution still images acquired during the burst mode, wherein the video frames are processed using a video pipeline, and the high resolution still images are processed using a high resolution still image pipeline, and wherein the video pipeline runs concurrently with the high resolution still image pipeline.

10. The joint video and still image pipeline of claim 9, wherein the high resolution still images are downsampled to be inputted into the video pipeline.

11. The joint video and still image pipeline of claim 9, further comprising an image/video transcoding agent capable of processing the video frames and the high resolution still images into standard format.

12. The joint video and still image pipeline of claim 9, wherein the video frames and the high resolution still images are acquired and stored in real time with high priority.

13. The joint video and still image pipeline of claim 9, wherein the video frames and the high resolution still images acquired during the burst mode are processed with low priority.

14. The joint video and still image pipeline of claim 9, wherein the processors are selected from a microprocessor, an application specific integrated circuit (ASIC), and a digital signal processor.

15. The joint video and still image pipeline of claim 9, wherein the processors downsample, demosaic, and color correct the video frames.

16. The joint video and still image pipeline of claim 9, wherein the processors downsample, demosaic, and color correct the high resolution still images using complex algorithms.

17. A computer readable medium providing instructions for concurrently processing digital video frames and high resolution still images in burst mode, wherein executing the instructions causes a machine to perform operations comprising:
   acquiring with high priority video frames and high resolution still images in burst mode from one or more image sensors;
   storing with high priority the video frames and the high resolution still images in raw format in a memory during acquisition of the high resolution still images in burst mode;
   processing with low priority the video frames stored in the memory using a video pipeline; and
   processing with low priority the high resolution still images acquired during the burst mode using a high resolution still image pipeline, wherein the high resolution still image pipeline runs concurrently with the video pipeline.

18. The computer readable medium of claim 17, wherein the instructions for acquiring include instructions for acquiring the video frames and the high resolution still images in real time.

19. The computer readable medium of claim 17, further comprising instructions for downsampling the high resolution still images to be inputted into the video pipeline.

20. The computer readable medium of claim 17, wherein the instructions for processing the high resolution still images include instructions for processing the video frames and the high resolution still images into a standard format by an image/video transcoding agent.

21. A method of processing image data captured by a digital video camera, comprising:
   acquiring image frames from an image senor;
   in a non-burst-mode of operation, processing acquired image frames using a video pipeline to compress acquired images to a video resolution level and storing the compressed image frames;
   in a burst mode of operation, storing acquired image frames in a memory in a raw format at a still image resolution level higher than the video resolution level, wherein at least one of the raw format image frames is designated a still image frame and other ones of the raw format image frames are designated video image frames;
   processing the still image frames stored in the burst mode of operation using a still image pipeline;
   processing the video image frames stored in the burst mode of operation using the video pipeline; and
   combining image frames processed by the video pipeline in the non-burst-mode of operation with video image frames stored in the burst mode of operation and processed by the video pipeline to generate a continuous compressed video sequence.

22. The method of claim 21, wherein the compressed image frames stored in the non-burst mode of operation are stored in a continuous memory sequence in the non-burst-mode of operation.

23. The method of claim 21, wherein processing the video image frames stored in the burst mode of operation comprises generating a compressed sequence of image frames at the video resolution level from still image frames and video image frames stored in the memory in the burst mode of operation.

24. A method of processing image data captured by a digital video camera, comprising:
   acquiring image frames from an image sensor;
   in a non-burst-mode of operation, processing acquired image frames using a video pipeline to compress acquired images to a video resolution level and storing the compressed image frames, wherein the compressed image frames stored in the non-burst mode of operation are stored in a continuous memory sequence in the non-burst-mode of operation;
   in a burst mode of operation, storing acquired image frames in a memory at an uncompressed still image resolution level higher than the video resolution level, wherein at least one of the uncompressed image frames is designated a still image frame and other uncompressed image frames are designated video image frames;
   processing the still image frames stored in the burst mode of operation using a still image pipeline;
   processing the video image frames stored in the burst mode of operation using the video pipeline; and
   marking memory locations in the continuous memory sequence corresponding to the burst mode of operation.

25. The method of claim 24, wherein image frames are stored in the burst mode of operation in the memory at locations separate from the continuous memory sequence.

26. The method of claim 25, wherein marking the memory locations comprises inserting in the continuous memory sequence pointers to respective memory locations where image frames acquired in the burst mode of operation are stored.

27. The method of claim 26, further comprising processing image frames acquired in the burst mode of operation using the video pipeline to generate a burst video sequence.

28. The method of claim 27, further comprising inserting a pointer from the burst video sequence to a location in the continuous memory sequence where subsequent image frames are stored in the non-burst-mode of operation.

29. The method of claim 23, wherein generating the compressed sequence of image frames comprises storing the compressed sequence of image frames at a memory location separate from where the image frames are stored in the non-burst-mode of operation.

* * * * *